United States Patent [19]
Schuh et al.

[11] Patent Number: 5,435,644
[45] Date of Patent: Jul. 25, 1995

[54] HOUSING FOR SELF-CONTAINED ISOLATED AUTOMATIC DEVICES AND THE LIKE

[75] Inventors: Eduard Schuh; Walter Gundel, both of Villingen-Schwenningen, Germany

[73] Assignee: Mannesmann Kienzle GmbH, Villingen-Schwenningen, Germany

[21] Appl. No.: 151,604

[22] Filed: Nov. 12, 1993

[30] Foreign Application Priority Data

Nov. 14, 1992 [DE] Germany .............. 92 15 530 U

[51] Int. Cl.⁶ .............................................. A47B 47/00
[52] U.S. Cl. ...................... 312/257.1; 312/205; 312/306; 211/186
[58] Field of Search ............ 312/205, 306, 312, 351, 312/257.1; 211/186, 187, 135

[56] References Cited
U.S. PATENT DOCUMENTS

| | | | |
|---|---|---|---|
| 726,555 | 4/1903 | Mayer | 312/257.1 |
| 868,310 | 10/1907 | White et al. | 312/351 |
| 1,008,075 | 11/1911 | Schaffert | 312/257.1 |
| 2,438,257 | 3/1948 | Stevenson et al. | 312/257.1 |
| 2,591,172 | 4/1952 | Lundine | 312/263 |
| 3,100,460 | 8/1963 | McElroy | 211/135 |
| 3,455,462 | 7/1969 | Morgan | 312/205 |
| 3,926,491 | 12/1975 | Greer | 312/205 |
| 3,944,310 | 3/1976 | Welsh | 312/265.5 |
| 3,950,049 | 4/1976 | Drass | 312/198 |
| 4,270,820 | 6/1981 | McMullan et al. | 312/265.5 X |
| 4,566,742 | 1/1986 | Schmied | 312/257.1 |
| 4,600,252 | 7/1986 | Barber | 312/263 |
| 4,790,611 | 12/1988 | Craner | 312/306 |
| 4,859,008 | 8/1989 | Eyre et al. | 312/257.1 |

FOREIGN PATENT DOCUMENTS 0843016 8/1960 United Kingdom ............ 312/257.1

Primary Examiner—Kenneth J. Dorner
Assistant Examiner—Janet M. Wilkens
Attorney, Agent, or Firm—Anderson Kill Olick & Oshinsky

[57] ABSTRACT

A housing for self-contained, isolated or free-standing automats having a ratio of the floor area dimensions to the height which is relatively small, comprises individual wall elements, which correspond to the height of the housing and which are fabricated from extruded aluminum. Intermediate bases or bottoms are provided which are disposed in planes located transversely to the wall elements to which the wall elements are bolted so as to mutually or respectively overlap.

6 Claims, 3 Drawing Sheets

HOUSING FOR SELF-CONTAINED ISOLATED AUTOMATIC DEVICES AND THE LIKE

FIELD OF THE INVENTION

The present invention is directed to a housing for isolated or free-standing automatic devices, and the like, wherein the ratio of the floor area dimensions to the height is relatively small.

BACKGROUND OF THE INVENTION

Such housings, for instance, for gasoline pumps, parking slip issue machines, mailboxes with postage issue, and cash registers for parking areas which are protected by barriers, are, as a rule, constructed of steel plate parts in view of the required security against burglars, which plates are connected with each other by welding or riveting. In view of such housings being erected outdoors, a high degree of corrosion resistance is required of the steel plate which is being used. In addition, the installation and fabrication expenses are considerable, since, apart from the bending and the welding tasks, plate thicknesses have to be machined which require specialized machines and which complicate the handling and the transport of these housing parts and housings due to the relatively high weight.

A high installation expense results further from the installation of intermediate bases or bottoms which are required for insertion devices or additional installations as well as the attachment of doors and flaps with pertinent hinge elements, for which purposes, as a rule, welding tasks become necessary at the housing walls.

This classical type of construction, which is practical for the manufacture of a single item, is of little use for fabrication in series with its requirement of as few working steps as possible, pre-fabricated structural components at high reproducability, and a rigorous utilization of standard parts and semi-finished material.

SUMMARY OF THE INVENTION

The objectives of the present invention consist in creating a housing suitable for the described application purpose, wherein fabrication and installation expenses, as well as its weight, are considerably reduced, which further meets the requirement of security against break-in and affords a satisfactory ability to be manufactured in series.

The solution of this objective by the present invention provides that individual wall elements, corresponding to the height of the housing and manufactured by extrusion from aluminum, be provided for the housing walls and that intermediate bottoms or bases be provided disposed in planes transversely to the wall elements and to which the wall elements are bolted so as to mutually overlap one another.

In particular, the invention proposes that rails enclosing a threaded channel be respectively molded to the wall elements, that the intermediate bottoms be directly bolted to the threaded channels, and that all the guidance and attachment means for insertion items and installations, hinge elements for doors and flaps, as well as, means for fastening the wall elements, be constructed or disposed at the intermediate bottoms or bases.

The present invention provides the advantage that the wall elements be cut to lengths in a discretionary manner, meaning, at lengths corresponding to the height of the housings to be fabricated, from the respective extrusion sections available as semi-fabricated products. Herein, the wall elements are already provided with threaded channels at their inner sides extending across the entire lengths. In addition, contours suitable for one single mutual labyrinth seal are built in. The external sides of the wall elements can evidently be structured to correspond to an imagined aesthetic view. A post-machining of the wall elements and an additional protection against corrosion is, in any case, unnecessary if extruded sections from aluminum are utilized.

It is further advantageous, that the fitting together of housing walls from individual wall elements permits a larger design latitude, meaning, housings with differing cross-sections can be designed in a simple way. On the other hand, wall elements can be used again for rework or a wall element which has been damaged, for instance, in a burglary attempt, can be replaced. The adaptation of the material thickness of the wall elements to the requirements which are a function of the security against break-in or which are intended to resist a break-in attempt for a specific time period, can be more easily fulfilled by the use of extrusion technology, this with a considerably lower housing weight than if a steel plate is used.

The intermediate bases or intermediate frames, provided in planes transversely to the wall elements, have in the proposed housing architecture, a load carrying and a housing stiffening function, especially, stabilizing same against distortion where the wall elements are bolted to the intermediate bases or bottoms, and fastening arrangements are made for the installation of structural groups, the placing of insertion devices and the fastening of doors and flaps. Due to the threaded channels, which are continuous across the entire length of the wall elements, and which enables attachment which is not visible from the outside, a tolerance compensation is readily possible during the installation of intermediate bases or bottoms, or in other words, a change in the height position of an intermediate base can be easily performed so that adaptations to customers desires can also be subsequently met and, also, in the last resort, so that an improved flexibility, when modifying an apparatus, exists.

In addition, several intermediate bases can be provided or an additional intermediate base can be subsequently installed without necessitating any drilling steps and so that the positions of existing intermediate bases can be changed, since the wall elements and the intermediate bases are detachably connected to one another and the design of the threaded channels permits an arrangement of the intermediate bases, which is stepless as far as height is concerned. On the other hand, intermediate bases represent a pre-fabricated component, at which means are configured which enable a precise positional fixation of the wall elements. Tolerances in the weight and depth of the housing are automatically compensated by the utilization of individual wall elements.

Other objects and advantages of the present invention will be apparent to those persons skilled in the art upon a review of the Description of the Preferred Embodiment taken in conjunction with the Drawings which follow.

DESCRIPTION OF THE PREFERRED EMBODIMENT

Figure 1:
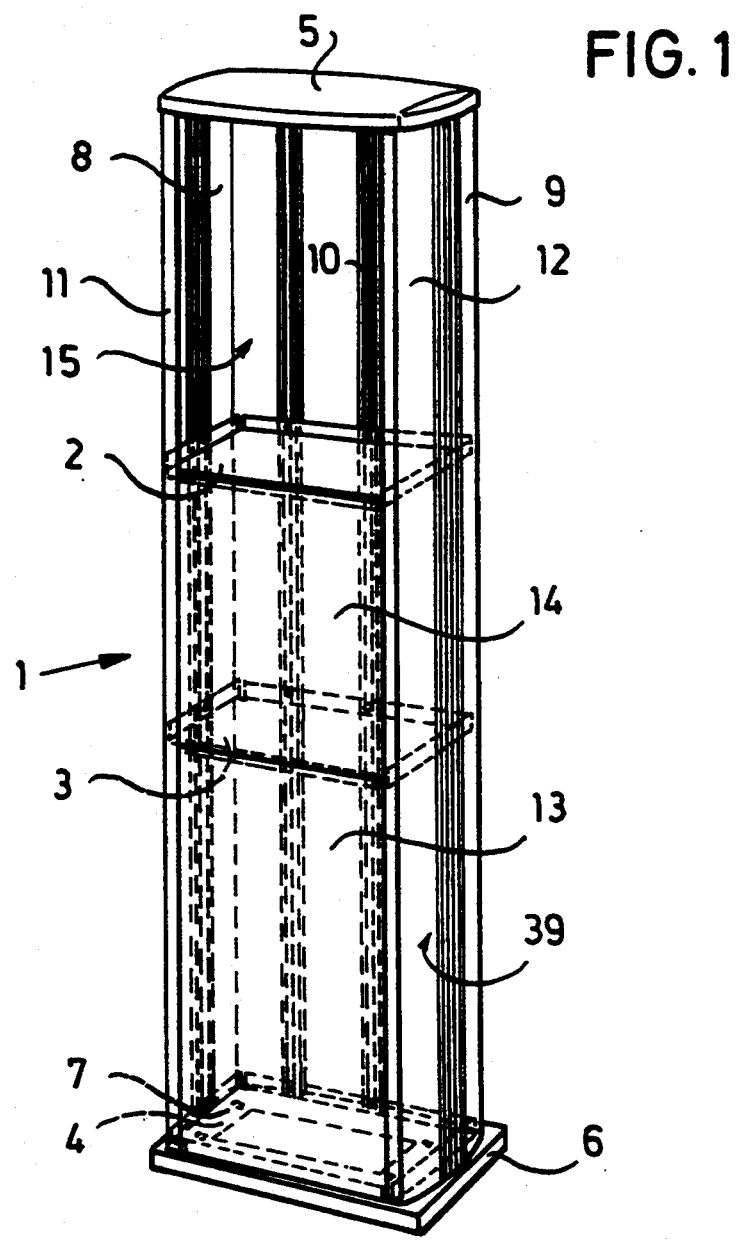
FIG. 1 illustrates an overview of the housing which is the subject of the present invention.

As illustrated in the overview in FIG. 1, the housing 1, which is shown in the embodiment example, consists of a first and a second intermediate base or bottom 2 and 3, respectively, an installation frame 4 and a roof element 5, which is also fastened on a frame (not shown). A facing frame 6 is allocated to the installation frame 4, by means of which the housing 1 is fastened, for instance, on a concrete pedestal (not shown). Bores provided in the installation frame 4 of which one is designated by the reference numeral 7, serve for the passage of threaded bolts which are embedded in the concrete pedestal. With the exception of the front side, the walls of the housing 1 are fitted together from individual wall elements corresponding to the height of the housing 1, which are fabricated from extruded aluminum. Herein, two identical angle section wall elements 8 and 9, to which a connecting intermediate wall element 10 is assigned, and two identical front frame wall elements 11 and 12 are provided. A cover plate forming a portion of the front wall is designated by the reference numeral 13. Reference numeral 14 designates a door or flap and reference numeral 15 represents, for instance, an opening for an insertion item displaceable on the intermediate base 2.

This housing concept could, for instance, be provided for a parking slip issue automat, wherein current supply aggregates are disposed in the lower space, the coin cassette is located in the middle segment and the usual functional units for the coin processing and the parking slip printing are located in the insertion device insertable into the top segment. In this case, an aperture for the passage of coins into the coin cassette provided with a suitable locking mechanism is located in the intermediate base or bottom 2.

Figure 2:
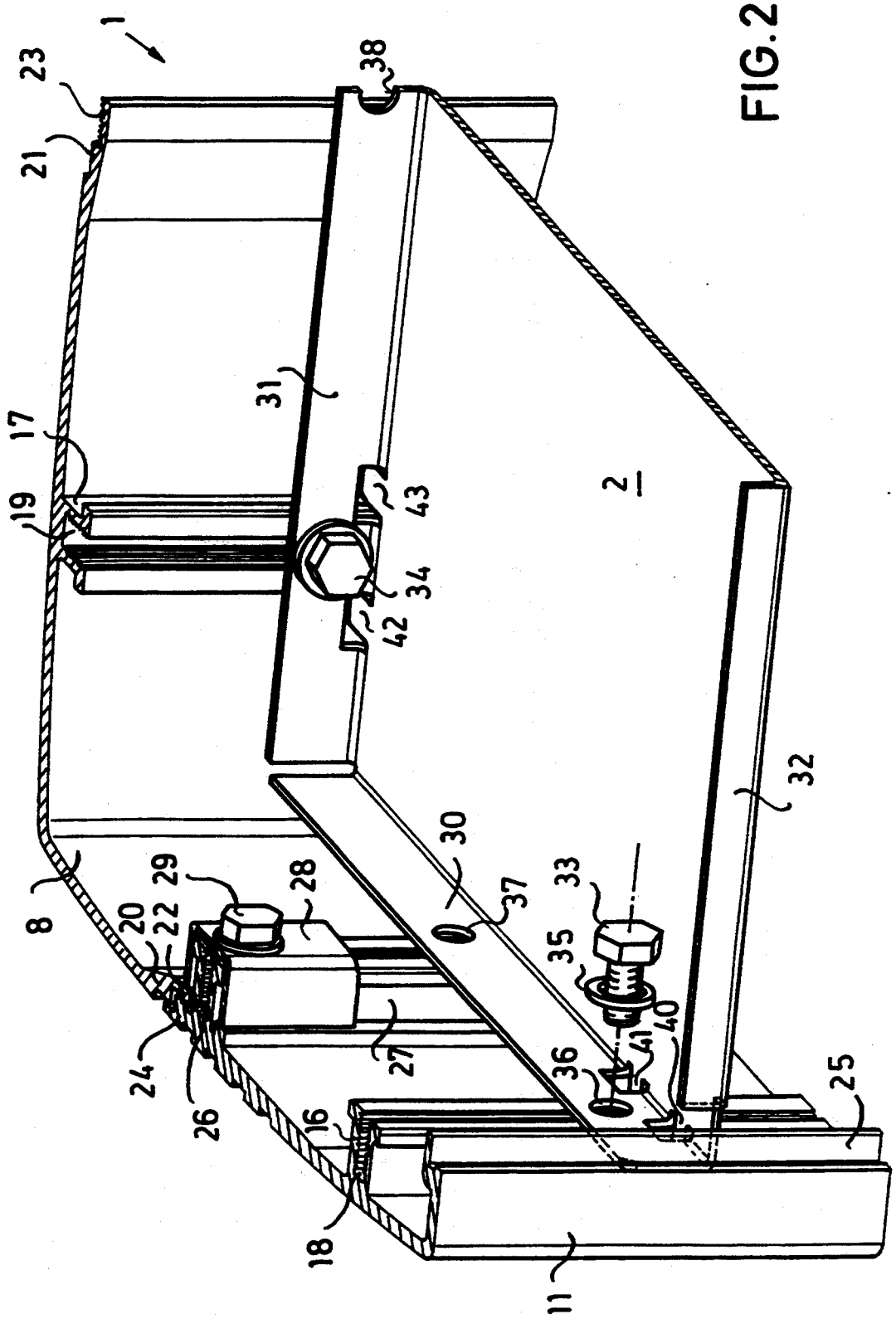
FIG. 2 illustrates a cutout from the housing of FIG. 1 in a perspective view.

FIG. 2 shows, in the illustrated cutout of the housing 1, how the two elements 8 and 11 are connected with the intermediate base 2. At least one rail 16 or 17 is molded at the wall elements 8 and 11, which rails enclose a threaded channel 18 or 19, at whose opposite walls there is respectively configured a thread section offset by half a pitch. The ends 20 and 21 of the legs of the wall element 8 have, respectively, several steps, wherein the steps point outwardly with serations 22 and 23 being provided on at least one step. Correspondingly, the one end 24 of the wall element 11 is configured in such a way that the steps point inwardly, so that an at least dust-proof labyrinth seal is formed and the wall elements 8 and 11 are fitted together in an overlapping manner. The other end 25 of the wall element 11 is angled off at the front side of the housing 1 and shaped, in such a way, that a sealing or stop section part can be placed thereon.

As can be further seen from FIG. 2, an additional rail 27, which encloses a threaded channel 26, is molded at the wall element 11, and is directly parallel to the overlap region of the two wall elements 8 and 11. The threaded channel 26 can serve for additional attachment of the intermediate base or bottom 2. However, it is mainly intended to detachably fasten the two wall elements 8 and 11 to one another using a U-shaped clamping piece 28. Herein, several short clamping pieces or a single continuous clamping piece can be provided across the length of the housing 1. In any case, the clamping piece 28 embracing the rail 27 with slight play abuts, on the one hand, on the wall element 8 and, on the other hand, on the wall element 11 when the bolt 29, which is assigned to it, is tightened, whereby the wall elements 8 and 11 are clamped together in the overlapping region. Such a reciprocal clamping of the wall elements is, however, not rigorously required, but rather, are used only if particularly high requirements are specified for the security of the engagement.

While an identical angle section wall element 9 follows upon the wall element 8 and the spacing between the two wall elements is small, the intermediate wall element 10, which has to be used, is also provided with a threaded channel. A clamping piece which serves for connecting and clamping the wall elements 8 and 9 together, abuts, in this case, upon both wall elements 8 and 9 when the bolts involved are tightened and the small t-shaped intermediate wall element 10 is pressed from the outside against both wall elements 8 and 9 and is either connected only to these or, in addition, bolted to the intermediate base 2. If a larger spacing is to be bridged by an intermediate wall element, then two threaded channels, which are preferably directed parallel to the overlapping regions, are configured in that case at the wider intermediate wall element.

As is further evident from FIG. 2, cheeks 30, 31 and 32 are bent off from the intermediate base 2, which are fabricated from steel plate, which serve for the stiffening of the intermediate base 2, as well as, for the fastening of the wall elements 8 and 11, by threading bolts 33 and 34 into the threaded channels 18 and 19, respectively. Through bore 36, in the cheek 30, is allocated, for this purpose, to the bolt 33 which cooperates with a washer 35. Through bores 37 and 38 are provided for the additional bolting of the intermediate base 2 to the wall element 11 and the intermediate wall element 10. It should additionally be noted, that, in the embodiment example shown, the wall elements are designed to be cambered and that by configuring several parallel grooves in the overlapping areas, on the one hand, the overlap gap is covered and, on the other hand, a stylistic element, designated by reference numeral 39, is created.

It is of a functional significance, that tangs 40 and 41 and 42 and 43 are cut from the intermediate base 2 so as to be exposed, and which rest sideways at the rails 16 and 17, whereby a precise alignment of the wall element is achievable and a spreading apart of the respective threaded channels 16 and 17 is prevented when the bolts 33 and 34 are tightened.

Figure 3:
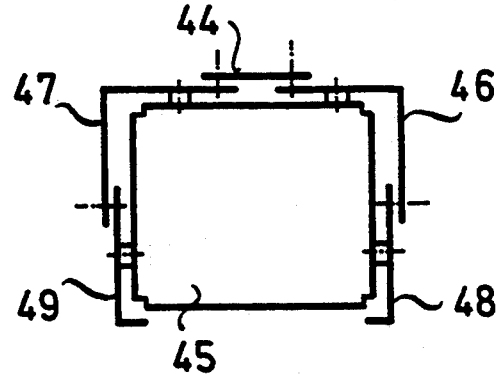
FIG. 3 illustrates a diagrammatic sketch of the cross-section of a housing whose front side is provided at a wide housing wall.

With reference to FIG. 3, it is illustrated that, in a housing 1, which has a rectangular cross-section, wherein the front side is formed by doors, flaps or front panels of inserts, is allocated to the wider housing wall, that only an intermediate wall element 44 and intermediate bases 45 must be changed for variation in the widths of the housing. The angular section wall elements 46 and 47 and the front frame wall elements 48 and 49 can be respectively reused. In case of using otherwise identical wall elements 46, 47, 48 and 49, two intermediate wall elements 50 and 51, and the intermediate bases 52 have to be changed in the case of the embodiment example in FIG. 4, wherein a front side is provided at a narrow housing wall, if only the depth of the housing has to be changed.

Figure 4:
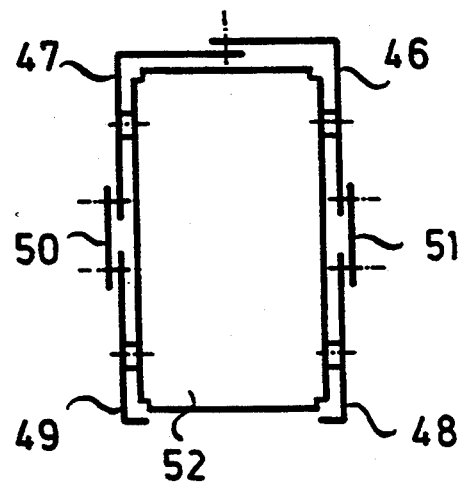
FIG. 4 illustrates a diagrammatic sketch of the cross-section of a housing whose front side is provided at a narrow housing wall.

Further, FIGS. 3 and 4 illustrate that largely discretionary rectangular housing shapes can be fabricated with respectively identical wall elements 46, 47, 48 and 49 and intermediate wall elements 44, 50 and 51 of different widths with appropriately shaped intermediate bases, wherein the wall elements can be interconnected and can be bolted to the intermediate bases forming a segmented envelope. It is further possible that the wall elements are bolted, respectively, individually to the intermediate bases or that, in case of high stability specifications, a multiple bolt connection must be provided in the respective intermediate base plane, for which purpose, threaded channels can advantageously be used which are intended for connecting the wall elements to one another. It is conceivable for housings with relatively small cross-sections to utilize one or two U-profiles depending upon the position of the front side of the apparatus involved and to connect these with an intermediate wall element or to assign front frame wall elements to a U-section front frame wall element constituting the rear wall.

Figure 5:
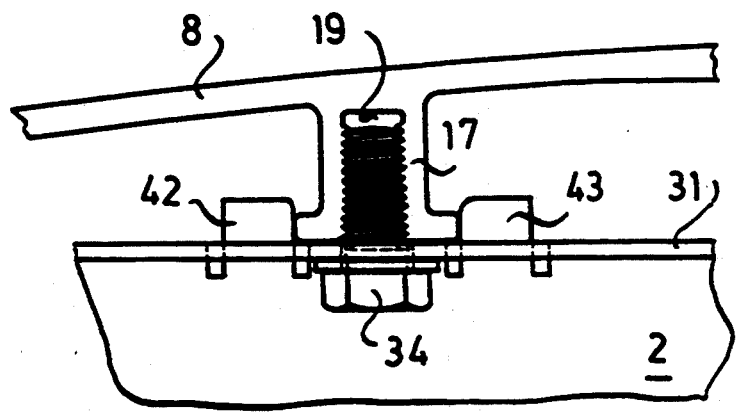
FIG. 5 illustrates in detail attachment of a wall element to the intermediate base.

FIG. 5 illustrates that the position of the wall elements, even if they are connected with one another, is defined by an inter-engagement of the tangs, which are configured at the intermediate bases with the rails configured at the wall elements.

While the present invention has been described in a preferred embodiment such is merely illustrative of the present invention and is not to be construed as a limitation thereof. Accordingly, the present invention includes all modifications, variations and/or alternate embodiments with the scope of the present invention limited only by the claims which follow.

What is claimed is:

1. A housing for self-contained free-standing automates having a relatively small ratio of a floor area to a height thereof, said housing comprising:
    individual wall elements having a height corresponding to the height of the housing, formed of extruded aluminum, and defining housing walls, wherein vertical end portions of adjacent wall elements overlap each other;
    at least one intermediate base disposed in a plane extending transversely to the wall elements; and
    means for connecting the wall elements to the intermediate base, the connecting means comprising individual rails each having a threaded channel and formed integrally with a respective individual wall element, and a plurality of bolts for bolting the intermediate base to threaded channels.

2. The housing of claim 1, further comprising an installation frame for erecting the housing.

3. The housing of claim 1, wherein the intermediate base includes cheeks extending parallel to the individual rails and each having a bore through which a bolt extends into a respective threaded channel, and further wherein the intermediate base includes a plurality of pairs of spaced tongs for embracing respective rails in a fork-like manner.

4. The housing of claim 1, wherein the individual wall elements include two angle wall elements each formed of two legs extending at a substantially right angle to each other, and wherein the two angle wall elements have legs lying substantially in a common plane and defining, at least partially, one wall of the housing.

5. The housing of claim 4, wherein the individual wall elements include an intermediate wall element arranged between the legs of the two angle wall elements which lie substantially in a common plane.

6. A housing for self-contained free-standing automates having a relatively small ratio of a floor area to a height thereof, said housing comprising:
    individual wall elements having a height corresponding to the height of the housing, formed of extruded aluminum, and defining housing walls, wherein vertical end portions of adjacent wall elements overlap each other;
    at least one intermediate base disposed in a plane extending transversely to the wall elements; and
    means for connecting the wall elements to the intermediate base,
wherein the individual wall elements include an angle wall element and a front frame wall element, and wherein the connecting means includes clamping connectors for connecting the individual wall elements with each other, and bolt means for bolting the angle wall element and the front frame wall element to the intermediate base.

* * * * *